Figure 1:
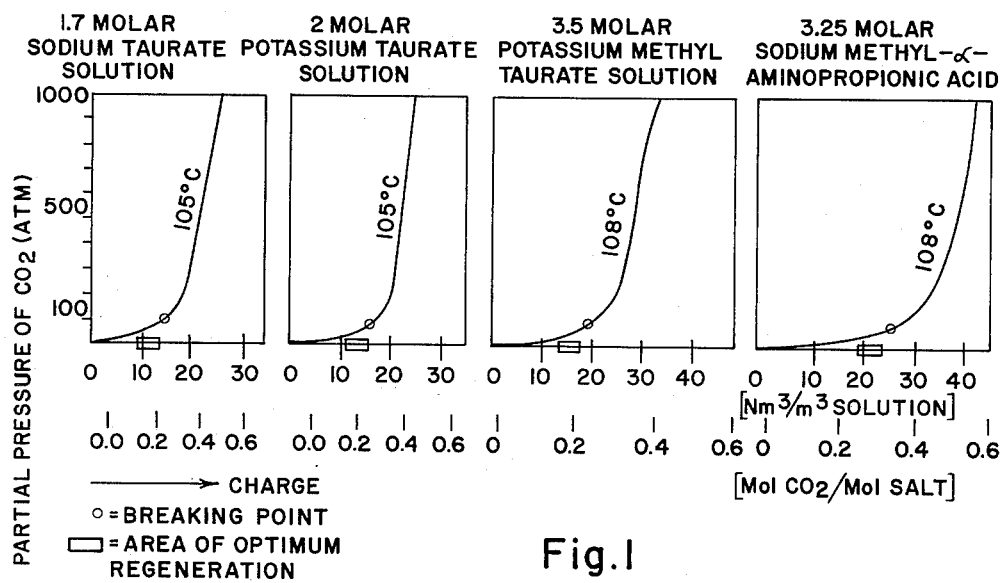

Arthur Wolfram
Herbert Kaltenhäuser
Harald Lorenz
Günther Relken
INVENTORS

United States Patent Office 3,042,483
Patented July 3, 1962

3,042,483
PROCESS FOR SEPARATING CARBON DIOXIDE FROM GAS MIXTURES
Arthur Wolfram, Herbert Kaltenhäuser, Harald Lorenz, and Günther Relken, all of Frankfurt am Main, Germany, assignors to Farbwerke Hoechst Aktiengesellschaft vormals Meister Lucius & Brüning, Frankfurt am Main, Germany, a corporation of Germany
Filed July 23, 1959, Ser. No. 828,987
Claims priority, application Germany July 29, 1958
9 Claims. (Cl. 23—2)

The present invention relates to a process for the practically quantitative separation of carbon dioxide from gas mixtures.

Many processes for separating carbon dioxide from gas mixtures are already known in the prior art. However, none of these processes permits the almost complete separation of carbon dioxide from gas mixtures containing the same in any amount with a minimum expenditure of energy and without consumption of chemicals.

It has now been found that, under proper conditions, carbon dioxide can be removed from such gas mixtures to give residual gas mixtures containing carbon dioxide at partial pressures of 0.01 to 0.1 mm. of mercury. These levels correspond with a carbon dioxide content of 14–140 parts by volume per million (p.p.m.) at a pressure of 1 absolute atmosphere, or 1.4–14 p.p.m. at a pressure of 10 absolute atmospheres. An aqueous solution, which may be regenerated practically as often as desired, is used for the removal of the carbon dioxide. The process of the invention also permits practically complete removal, from the solutions containing absorbed carbon dioxide, of other soluble gases which may be present, such as acetylene, homologs thereof, or lower olefins, without the removal of large amounts of carbon dioxide. The amount of steam consumed in the process is less than in known processes using alkylol amines, which latter permit removal of carbon dioxide, under usual working conditions, only to a partial pressure in the residual gas of about 0.8 to 1.5 mm. Hg (1000–2000 p.p.m. at 1 absolute atmosphere or 100–200 p.p.m. at 10 absolute atmospheres). For further purification in these latter processes, further treatment of the residual gas with caustic alkali, or elevated process pressure, is required.

In the process of the present invention, aqueous solutions of salts of certain weak organic acids with strong bases are employed as absorbents. Not all salts of any weak organic acids are suitable, but only the salts of those amino acids that are capable of forming carbamic acids with carbon dioxide.

The use of aqueous solutions of some salts of weak organic acids with strong bases to remove carbon dioxide from gas mixtures has been known for more than 20 years. However, no process has been proposed which enables carbon dioxide to be removed from a gas mixture by a single scrubbing at atmospheric pressure to a residual content of less than 100 p.p.m. under normal conditions. Prior art processes using such solutions at best remove carbon dioxide to a residual content of 0.1% by volume. To separate the last residues of carbon dioxide, a second treatment with solutions of sodium hydroxide is required. Not only is the hydroxide continuously consumed—and must be replaced, but the necessity for two gas washing units with two different washing agents involves a greater expenditure for apparatus, and is industrially and economically disadvantageous.

The process of the present invention is based on the observation that the equilibrium $CO_2$ partial pressure over an absorbing solution is dependent on the state of charge of the absorbing solution (at a given temperature) and, moreover, that the rate of mass transfer of $CO_2$ between the gas phase and the absorbing solution is much greater at lower charge concentrations of $CO_2$ in the absorbing solutions than at higher charge concentrations. The rate of mass transfer $k_G$ is defined by the relation $$k_G = \frac{G_{CO_2}}{F \Delta p}$$

wherein $G_{CO_2}$ is the amount of gas exchanged in standard cubic meters per hour, F is the surface area of the absorbing solution in square meters, and $\Delta p$ is the partial pressure gradient in absolute atmospheres. The dimensions of $k_G$ are, therefore, standard $m.^3/hour \times m.^2 \times$ absolute atmosphere.

The above-mentioned increase of the rate of mass transfer at low $CO_2$ charge in the solution occurs to a pronounced extent only for solutions of salts of those amino acids capable of forming carbamic acids. For example, the rates of mass transfer for solutions of taurate and methyl taurate salts, which are capable of forming carbamic acids, with $CO_2$ at low charge concentrations (about 0.1–0.2 mol $CO_2$ per mol of amino acid), are more than twice as high as for dimethyl taurate, which does not form a carbamate with $CO_2$, although the rates of mass transfer at high charge concentrations (about 0.5 mol $CO_2$ per mol of amino acid) are practically equal.

Figure 2:
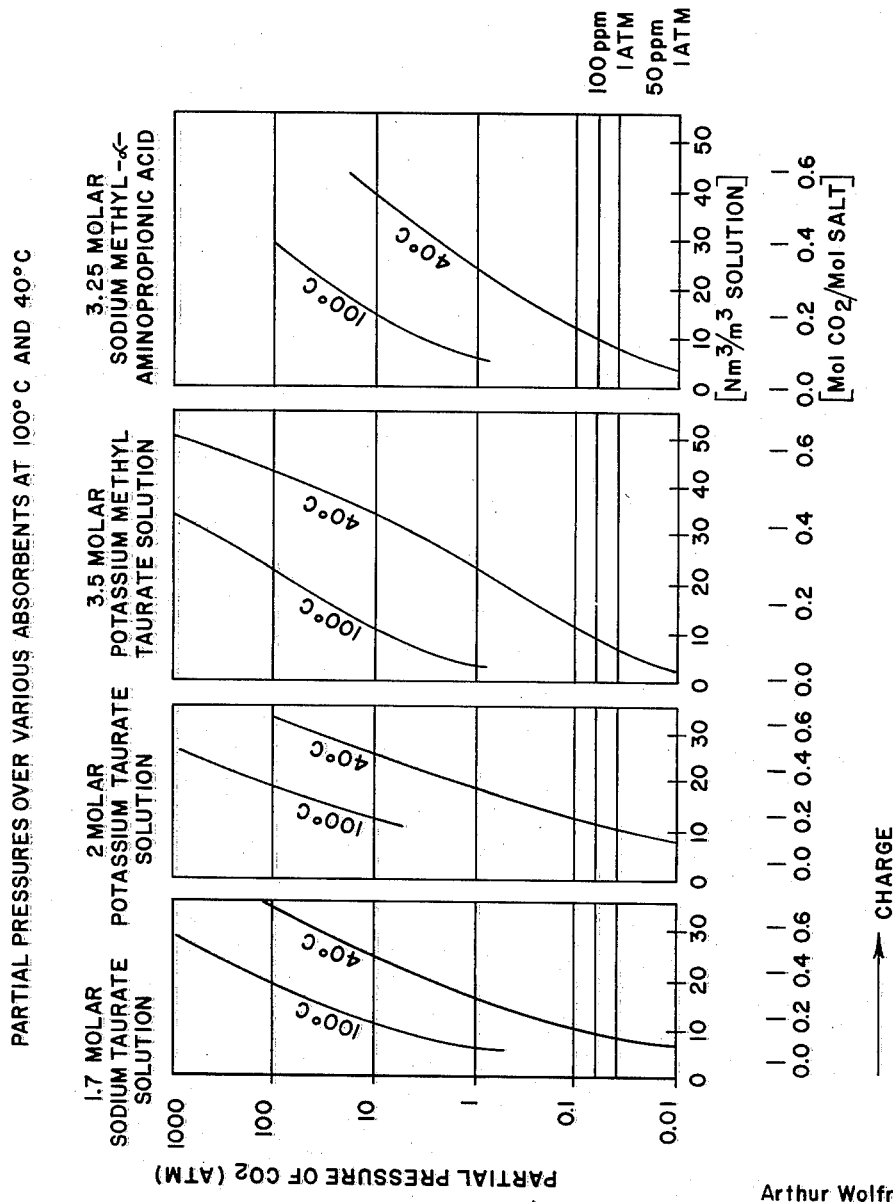

If the partial pressure of $CO_2$ over a regenerable absorption solution is plotted, at a given temperature, against the $CO_2$ charge in the solution, a more or less pronounced bend, or inflection point, appears in the isotherm (FIGURE 1). [If the partial pressure of $CO_2$ is plotted on a semi-lorarithmic scale, the absorption isotherms are approximately straight lines (FIGURE 2)]. The bend, or inflection point, defines the lowest charge concentration which can be reached, on desorption of the solution, with a minimum expenditure of steam or foreign gas, or with minimum vacuum pump energy in case the carbon dioxide is desorbed in a counter-current column.

A practical limit on the maximum charge concentration of $CO_2$ in the absorbing solutions is determined by the partial pressure of carbon dioxide in the crude gas mixture containing the same, by the nature of the absorbing agent and its concentration in the solution, and by the absorption temperature. Assuming a fixed upper charge limit, the amount of steam required for steam regeneration of the absorbing solution can be calculated as a function of the degree of regeneration of the solution. These calculations show that for a greater degree of regeneration, a greater amount of steam is required per unit amount of liquid per unit time. However, if a fixed amount of carbon dioxide is to be desorbed in unit time, then a greater amount of liquid must be circulated and heated when a lesser degree of degeneration is effected than when the solution is more strongly regenerated. Thus, up to a certain limit, a smaller amount of steam is required per unit of carbon dioxide removed when a high degree of regeneration is used than when using a low degree of regeneration, since the slightly increased need for steam to effect the higher regeneration is over-compensated by the steam saving brought about by the use of smaller amounts of solution regenerated.

However, if regeneration is effected such that the $CO_2$ charge concentration has a value below the inflection point in the charge diagram isotherm (FIGURE 1), a larger quantity of steam is required to recover each unit of carbon dioxide, and the consumption of steam is multiplied for even slight increases in the degree of regeneration.

Down to the limit characterized by the inflection point in the equilibrium isotherms, the amount of steam required per unit of carbon dioxide recovered does not increase as the degree of regeneration increases, contrary to usual opinion. Rather, if a fixed maximum charge limit is assumed, the amount of steam needed decreases per unit of carbon dioxide recovered. (For foreign gas or vacuum regeneration, similar results pertain.)

This optimum degree of regeneration involving minimum steam consumption is clearly defined by the inflection or bending point in the $p_{CO_2}$/charge diagram for any absorption solution and any desorption temperature and is determined by the chemical structure and concentration of the absorption solution. For aqueous solutions of salts of amino acids capable of forming carbamic acids—for which solutions in most cases in the range of charges of 0.15 to 0.7 mol carbon dioxide per mol salt the logarithm of the $CO_2$ pressure above the solution depends in roughly linear manner on the loading state—said optimum degree of regeneration is situated at a working temperature in the range from $+100°$ C. to $+115°$ C. at 0.10 to 0.20 mol carbon dioxide per mol salt and in most cases at about 0.16 mol $CO_2$/mol salt. With solutions of this kind, regenerated with a minimum consumption of energy the following $CO_2$ partial pressures can be theoretically obtained in the gas to be washed out at a temperature at the head of absorption column of:

| | |
|---|---|
| $+20°$ C. | 0.01 to 0.05 mm. of mercury |
| $+30°$ C. | 0.03 to 0.15 mm. of mercury |
| $+40°$ C. | 0.07 to 0.35 mm. of mercury |

At a temperature below $+20°$ C. the theoretically obtainable partial pressure are, of course, still lower. In practice, however, it is almost impossible continuously to maintain a temperature below $+20°$ C. in an economic manner. The value of the theoretically obtainable $CO_2$ partial pressure depends, of course, slightly on the nature of the amino acid, the cation to which the amino acid is bound, and on the concentration of the washing solution. Said partial pressures correspond at a working pressure of 1 absolute atmosphere to the following $CO_2$ contents in the washed gas: 14 to 68 p.p.m at 20° C., 40 to 204 p.p.m. at 30° C. and 95 to 460 p.p.m. at 40° C.; under a working pressure of 10 absolute atmospheres to 2 to 7 p.p.m. at 20° C., 4 to 20 p.p.m. at 30° C. and 10 to 46 p.p.m. at 40° C. Since in the range of low charges the rates of mass transfer for carbon dioxide are particularly favorable, the indicated $CO_2$ partial pressures can be approximately obtained in industrial columns.

Thus in the process of the invention the consumption of steam is smaller in a washing process carried out to a $CO_2$ residual content of a few p.p.m. than in a washing process with some tenth percent of residual $CO_2$.

With other absorption solutions, such as the solutions of salts of amino acids that are not capable of forming carbamic acids, alkylolamino solutions, potash solutions and potassium arsenite solutions, the curves in the $p_{CO_2}$/charge diagram have a different shape. Thus with solutions of this kind, which have been regenerated under optimum conditions, there can only be obtained in the washed gas a $CO_2$ residual content which is at least ten times as high as the residual content reached with the solutions of salts of amino acids capable of forming carbamic acids, which have likewise been regenerated under optimum conditions. From the same gas the carbon dioxide can be removed at atmospheric pressure and at 30° C. with potassium taurate or potassium methyltaurate, for example, down to less than 100 p.p.m., whereas with potassium dimethyl taurate the carbon dioxide can only be removed down to a content of 0.3–0.5% by volume (corresponding to 3,000–5,000 p.p.m.). The economical and practically complete removal of the carbon dioxide is consequently obtained in the first place by effecting the regeneration of the charged solutions only to the bending point of the isotherms in the $p_{CO_2}$/charge diagram and, furthermore, by cooling the absorption solution, according to the desired degree of purity of the gas to be washed out, to an extent such that the temperature at the head of the absorption column is below the temperature theoretically required for the desired degree of purity.

Furthermore, the economy of the process largely depends on the carrying capacity (difference in content of carbon dioxide between the loaded and the regenerated solution) of the solution used. Since the rational degree of regeneration (industrially obtainable residual charge of the solution leaving the desorption column) is determined by the position of the bending point in the $p_{CO_2}$/charge diagram, the technically obtainable maximum charge of the solution must be as high as possible if large carrying capacities are to be reached. Since the rates of mass transfer largely decrease with increasing loads, an increase of the capacity by the enlargement of the apparatus dimensions is naturally limited. A further enlargement of the carrying capacity is only possible by using absorption solutions of higher molar concentration.

In the process of the invention there are suitable as salts of amino acids, for example, the alkali metal salts of taurine, N-methyltaurine, N-methyl-$\alpha$-amino propionic acid, glycocoll, sarcosine, $\alpha$-alanine, N-($\beta$-ethoxy)-taurine and N-($\beta$-amino-ethyl)-taurine, either individually or in admixture with one another. There may furthermore be used other amino acids of the formula

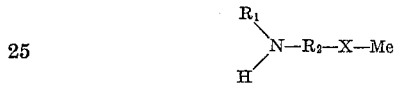

wherein $R_1$ represents a hydrogen atom or an aliphatic radical which may be substituted by amino groups or alcoholic or ether oxygen, $R_2$ stands for an alkylene radical having at least 2 carbon atoms and X means the radical —$CO_2$— or preferably —$SO_3$—. The alkyl or alkylene radicals may likewise be branched and the branchings may form rings. The use of salts of such acids in which X stands for —$SO_3$— presents the advantage that said compounds have no corrosive action on steel. Surprisingly, contrary to solutions of salts of $\alpha$-amino carboxylic acids, solutions of salts of $\gamma$-amino carboxylic acids do not have corrosive effects on the apparatus, whereas solutions of salts of $\beta$-amino carboxylic acids have certain but negligible corrosive effects. When using $\alpha$-aminocarboxylic acids the corrosion may be reduced by adding to the acids at least 1.5 times the amount of alkalies required for salt formation. In the case of amino-sulfoacids the presence of such a high amount of alkali is not required; it is possible, for example, to use solutions containing 0.8–1.2 equivalents of alkali per mol of acid. The following compounds are mentioned by way of example:

$$NH_2—CH_2—CH_2—NH—\underset{\underset{CH_3}{|}}{CH}—CH_2—SO_3Me$$

$$NH_2—CH_2—CH_2—NH—CH_2—CH_2—SO_3Me$$

$$HO—CH_2—CH_2—NH—CH_2—CH_2—CH_2—SO_3Me$$

or the methyl, ethyl, propyl, isopropyl or a butyl ether of said compounds or

In case the radical $R_1$ represents an organic radical it is, like $R_2$, preferably an aliphatic or cycloaliphatic radical having at most 8 carbon atoms, for example, the methylcyclohexyl, cyclohexyl, hexyl, isobutyl, diisobutyl, propyl, ethyl or methyl radical or the corresponding alkylene radical. "Me" may be the cation of any inorganic or organic base and preferably an alkali metal.

However, concentrated commercial solutions of these substances have the troublesome property of forming precipitates even at moderate charges when at a temperature of from 30° to 60° C. Therefore, they must either be introduced into the absorption column at elevated temperature—which involves a deterioration of the carbon dioxide separation—or they must be used in dilute form which results in a smaller carrying capacity and, in the case of a steam regeneration, an increased consumption of steam and, furthermore, necessitates apparatus of larger dimensions.

Among the substances that are readily accessible in large amounts the potassium salt of the monomethyltaurine or a mixture thereof with the corresponding sodium salt containing a preponderant molar proportion of the potassium salt has proved to be particularly suitable. Also solutions of potassium N-(β-ethoxy)-taurate and potassium N-(β-amino-ethyl)-taurate or the mixtures thereof with the corresponding sodium salts are well suitable. A potassium N-methyltaurate solution can be used in a concentration of 3.5–4.5 mols per liter without precipitates forming in the temperature range concerned. Such a 3.5 molar aqueous solution has a viscosity of 3.6 cp. at 40° C., a density of 1.26 at 20° C. and a practical carrying capacity of 35 to 40 or more standard m.$^3$ $CO_2$/m.$^3$ solution. With a complete utilization of the carrying capacity of the solution said solution warms up by about 30° C. due to the high absorption heat of carbon dioxide of about 20 kcal./g. mol carbon dioxide. When the solution is introduced into the absorption column at a temperature of +30° C. the solution leaves said column at a temperature of about +60° C. whereby the undesirable and mostly very low physical solubility of other gases, such as acetylene and its homologs or lower olefins, is further considerably reduced. This constitutes a great advantage of the one-stage working process and is caused by the use of a solution of high molar concentration. Moreover, a smaller amount of liquid must be circulated due to the higher carrying capacity. Thus the possible losses of the gases to be purified are further reduced. In case the gas to be washed out contains valuable components, which are physically soluble in the washing liquid, it may be of advantage to saturate the washing liquid with carbon dioxide only to an extent such that the $CO_2$ partial pressure above the solution leaving the absorption is smaller than 1 absolute atmosphere, for example, 0.3 absolute atmosphere, since it is then possible to remove the physically dissolved gases from the solution charged with carbon dioxide by stripping with a foreign gas and/or by the application of a vacuum without larger amounts of carbon dioxide being liberated (the indicated values apply to the partial pressures of the physically soluble gases of 0.6 to 3 absolute atmospheres; with different pressures the values must be varied accordingly). By such a working method the carrying capacity of the solution is only slightly reduced. When, with other absorption solutions for carbon dioxide—for example with a potassium carbonate solution or potassium arsenite solution—the physically dissolved gases are to be separated from the absorbed carbon dioxide, said solutions must either be used with a considerably smaller carrying capacity or the expelled, physically dissolved gas contains considerably higher amounts of carbon dioxide. In both cases the known processes then require considerably greater expenses if valuable, physically dissolvable gases present in the crude gas are to be recovered.

In the process of the invention it is of advantage to use concentrated aqueous solutions of salts of the aforesaid amino acids as absorption liquids, which solutions, after the first $CO_2$ absorption, are only regenerated (desorbed) to the bending point of the equilibrium isotherms in the $p_{CO_2}$/charge diagram (FIGURE 1) i.e. to a charge ranging from 0.10 to 0.20 and preferably from 0.14 to 0.18 mol $CO_2$ per mol dissolved salt, to introduce the regenerated solutions into the absorption column at a temperature, adjusted to the desired washing effect, of less than 60° C., preferably 20–40° C., and there to recharge the solutions with carbon dioxide up to 0.50–1.10, preferably 0.55–0.75 mol $CO_2$ per mol dissolved salt. For increasing the carrying capacity one or several intermediate coolers may be installed in the absorption column.

When fresh washing solutions are used for the first time the amount of solution to be circulated per unit of time is calculated as if said solutions had a residual charge corresponding to the bending point. When first passed through the absorption column the solution is charged—but naturally not to the maximum capacity—and in the following first desorption it is better regenerated than corresponds to the bending point. In the second passage the regenerated solution enters the absorption column with a certain load and leaves said column with a $CO_2$-concentration that is higher than the concentration after the first passage, without reaching, however, the maximum concentration. Only after about 10 to 15 passages the dynamic equilibrium state is adjusted, which corresponds to the most favorable consumption of energy.

It has furthermore been found that the bending points of the equilibrium isotherms in the $CO_2$ charge diagram (FIGURE 1) can be shifted to the left, that is to say to lower $CO_2$-concentration values, by the addition of an excess of amino acid, calculated on the amount contained in the salt. As free amino acids there may be used one of the aforesaid acids, which is advantageously but not necessarily identical with the amino acid contained in the added salt. It is recommended to add an excess of acid of up to 25% by weight, calculated on the amount of acid contained in the salt. To produce a solution containing free amino acid it is likewise possible to add a definite amount of a strong acid, for example sulfuric acid or hydrochloric acid, in order to liberate from the dissolved salt a corresponding amount of amino acid. By the addition of free amino acids the maximum capacity of the solution is practically not modified, while the bending point is shifted to the range of lower charges, whereby the carrying capacity is obviously enlarged.

Part of the steam used for the regeneration leaves the absorption column entrained together with the carbon dioxide. Said steam must be produced in the sump boiler of the regeneration column at the boiling temperature of the solution (in the case of a 3.5 N potassium methyltaurate solution at about 108° C.). In order to consume in the boiler of the regeneration column as little steam as possible it is of advantage to introduce into the sump as much steam at 100° C. as leaves the head of the desorption column together with the carbon dioxide. The consumption of steam is thus somewhat reduced and the cooler required in the known and similar processes at the head of the desorption column can be omitted if the carbon dioxide shall not be further utilized.

A further step for economizing steam consumption consists in degassing the carbon dioxide stepwise at gradually increasing temperatures, the applied temperatures being advantagesously about 10 to 60° C. lower than the temperature of the main regeneration. Since part of the carbon dioxide is thus liberated at lower temperatures, it naturally entrains a smaller amount of steam. The heating of the individual stages is performed by heat exchange by means of the solution leaving the sump of the desorption column, which solution is conducted in a counter-current with the solution flowing to the desorption column. With, for example, a preregeneration of the charged solution in 4 stages, 4 currents of carbon dioxide are obtained. Physically dissolved gases may be present as impurities in said 4 $CO_2$ currents and the carbon dioxide leaving the following main regeneration can be obtained with a purity of 99.9%. The $CO_2$ currents leaving the individual stages of the preregeneration may be reconducted, depending on the purity of the carbon dioxide obtained in the corresponding stage, to the crude gas compression or they may be used for applications for which carbon dioxide of an inferior degree of purity is sufficient, or with a sufficient purity they may be combined with the carbon dioxide leaving the main regeneration. With a simultaneous economization of steam consumption the process of the invention is thus more adaptive to varying compositions of crude gas than the known processes. The different stages of the preregeneration may likewise be heated wholly or partially by any waste water having a sufficiently elevated temperature. The normal desorption which is not combined with a preregeneration may likewise be performed in a countercurrent apparatus at atmospheric pressure, in which case the steam and/or the foreign gas, such as hydrogen, nitrogen or air, is used for expelling the carbon dioxide. It is likewise possible to carry out the normal desorption under elevated or reduced pressure. When the desorption is effected under elevated pressure it is necessary to heat to a higher temperature in order to surmount the higher pressure. This procedure is of importance, for example, if the expelled carbon dioxide is to be used for the production of Dry Ice. As compared therewith the application of low pressure is preferred in the desorption when pure carbon dioxide free of stripping gases shall be obtained. In this case the desorption is realized at a temperature which is, for example, 20–30° C. lower than the boiling point of the solution under normal conditions. Since working under reduced pressure means using lower temperatures, the solution and the sensitive gases present therein are less impaired. In this case heating may be brought about by hot waste water instead of steam.

In addition to the desorption the absorption can also be carried out at superatmospheric pressure, pressures in the range from 3 to 30 absolute atmospheres being preferable. The suitable pressure depends on the nature and on the intended use of the starting gas mixture, for example, on the explosivity of the gases.

In the case of highly compressed gases rich in carbon dioxide it is possible, as known in general, to remove the carbon dioxide with the utilization of the pressure difference to atmospheric pressure almost without steam consumption to give a partial pressure in the washed gas of 1 to 0.6 absolute atmosphere with the aid of a "bulk scrubbing" e.g. with hot potassium carbonate. The process of the present invention is adaptable to removing the last residues of carbon dioxide from gases roughly prepurified by the performance of "$CO_2$-bulk-scrubbing," for example a scrubbing with hot potassium carbonate solution, the advantages of the process being maintained.

The following example serves to illustrate the invention but it is not intended to limit it thereto.

*Example*

From a gas mixture of standard 10,000 m.$^3$/h. having a content of carbon dioxide of 20% by volume the carbon dioxide is to be washed out down to a residual content of 20 p.p.m. ($2.10^{-3}$% by volume).

Figure 3:
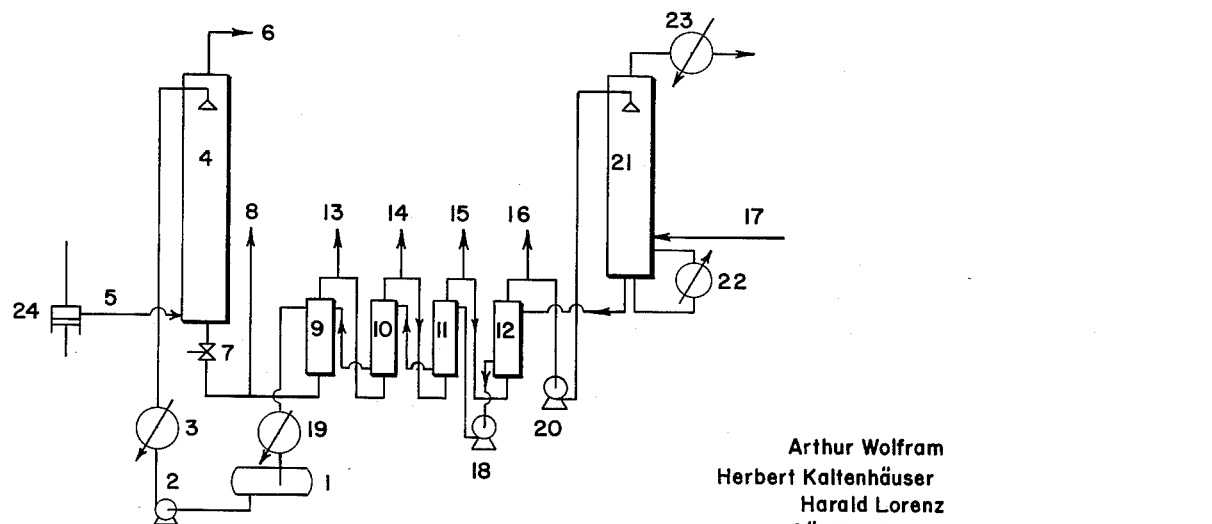

The carbon dioxide is absorbed under a pressure of 15 absolute atmospheres with the use of a 3.5 molar aqueous potassium methyl taurate solution in an apparatus as shown in FIGURE 3.

The regenerated absorption solution poor in carbon dioxide from container 1 is introduced at the head of the absorption column 4 via the pump 2 and the cooler 3. After having traversed the column 4 the charged solution leaves said column at the bottom. The gas mixture enters into the column at 5 and leaves the column at the head 6 with a residual content of $CO_2$ of 20 p.p.m.

The $CO_2$ partial pressure amounts to $15.0.2=3$ absolute atmospheres at the gas inlet 5 and to $15.20.10^{-6}=3.10^{-4}$ absolute atmosphere at the gas outlet 6. The possible maximum gassing breadth is defined by said values. The industrially obtainable gassing breadth is somewhat smaller since a corresponding partial pressure gradient must be present to limit the dimensions of the absorption column.

Figure 4:
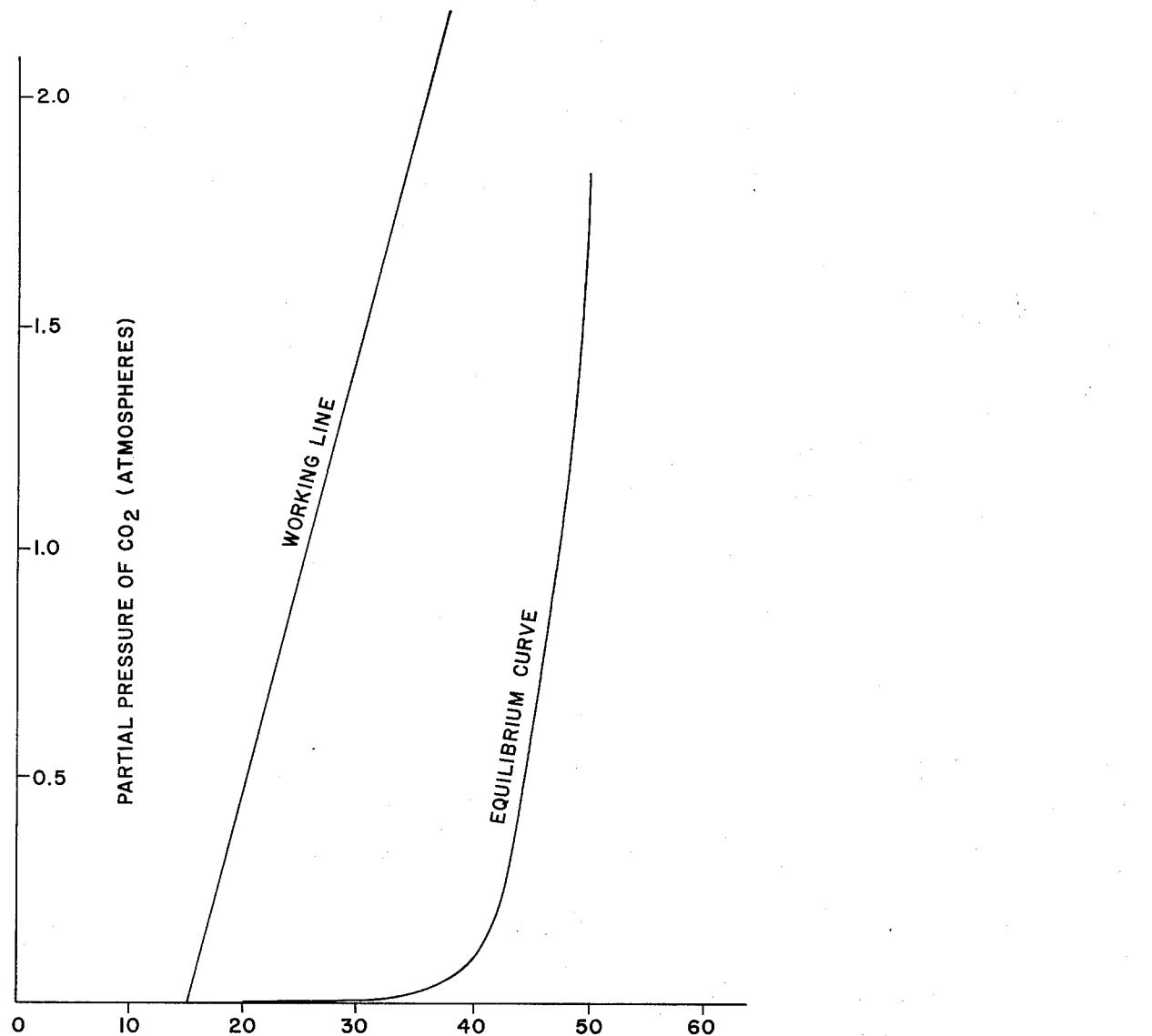

The solution poor in carbon dioxide is introduced at the head of the absorption column with a residual charge of 15 m.$^3$ (at NTP) $CO_2$/m.$^3$ solution and leaves at the bottom with a charge of 50 m.$^3$ (NTP) /m.$^3$ solution. The gassing breadth is $50-15=35$ m.$^3$ (NTP) /m.$^3$ solution (FIGURE 4). The amount of solution circulated per hour amounts to 57 m.$^3$. The solution is introduced into the column at the head at a temperature of 30° C. The absorption heat evolved during the absorption of carbon dioxide heats the liquid which leaves the absorber at a temperature of 57° C. In the release valve 7 the pressure of the solution is released from 15 to 1.8 absolute atmospheres, whereby the solution is degassed by the escape of some carbon dioxide and the main portion of the physically dissolvable gases (for example acetylene, ethylene or higher hydrocarbons). Said gas current 8 may be reconducted into the absorption column via compressor 24 in order to avoid a loss of valuable gases. The solution then travels through four heat exchangers (9, 10, 11 and 12) connected in series. After each heat exchanger a degassing device is provided for (13, 14, 15 and 16). By said intermediate degassing an impediment of the heat exchange in the individual exchangers by too large gas charges is avoided. Furthermore, the amount of steam taken up by the carbon dioxide is considerably smaller than with the use of only one heat exchanger, since only a small portion of the carbon dioxide removed by heat exchange is heated to a higher temperature. The solution poor in carbon dioxide leaving the desorption phase is conducted in a countercurrent with the charged solution, whereby the desorbed solution gives up its heat to the charged solution. The charged solution is thus heated from 55 to 85° C. while the regenerated solution is cooled from 108 to 65° C.

In the heat exchange a total amount of 850 m.$^3$ (NTP)/h. (42.5% by volume of the absorbed $CO_2$) are degassed. After having left the last heat exchanger 12 the charged solution is conducted to the pump 20 and from there to the head of the desorption column 21. The solution flows downwards and the carbon dioxide is removed from the solution (stripping) by means of steam produced in the sump boiler 22. The mixture of carbon dioxide and water leaving at the head is cooled in condenser 23 and the entrained steam is condensed. Through an inlet 17 an amount of steam (strip steam) is introduced at the bottom into the desorption column under a pressure of 1.5 absolute atmospheres as corresponds to the amount of steam entrained with the carbon dioxide at the head (1.38 tons/h.). The solution poor in carbon dioxide leaves the sump of the column at boiling temperature (108° C.) and travels into the heat exchanger 12. The somewhat cooled solution then flows to pump 18 which produces the pressure required for overcoming the pressure loss in the heat exchangers (11, 10 and 9) connected in series. After having traversed the heat exchangers (11, 10 and 9) the solution is introduced by way of cooler 19 into the reservoir 1 and from there it is reconducted, as described above, into the absorption column 4.

The exact conditions in the absorption column are illustrated in the diagram of FIGURE 4 where the $CO_2$ partial pressure is the ordinate and the $CO_2$ charge of the solution the abscissa. The diagram shows that the working line, i.e. the partial pressure of the carbon dioxide in the gaseous phase, forms a straight line. The equilibrium curve, i.e. the $CO_2$ partial pressure above the liquid first takes a very flat turn and then a steep turn upwards at a charge of 40 m.$^3$ (NTP)/m.$^3$ solution. The driving partial pressure gradient (ordinate distance) is sufficiently large; only with low $CO_2$ partial pressures, that is to say on removing the $CO_2$ residues at the head, the driving fall is smaller.

The course of the curves reveals that the working line and the equilibrium line cut one another approximately at a charge of 55 m.$^3$ (NTP) $CO_2$/m.$^3$ solution, that is to say said charge can only be obtained with the adjustment of the equilibrium (height of column $\infty$). For the chosen gassing breadth of 15 to 50 m.$^3$ (NTP)/m.$^3$ the following column is required:

Filling height _____ 20 meters.
Diameter _____ 2.5 meters.
Charge _____ Pall rings 25 x 25 mm.

In the heat exchange the difference in temperature amounts at the warm end to $108-85=23°$ C. and at the cold end to 65—55=10° C. With the medium logarithmic temperature difference of 15.5° C., a heat transition value of 200 kcl./m.$^2$/h. ° C and a transferred heat of 2.3.10$^{-6}$ kcal./h. a heat exchange surface of 750 m.$^2$ is required. The heat exchange surface used has a dimension of 4 x 200 m.$^2$.

The degassing conduits (13, 14, 15 and 16) for the degassing after the individual heat exchangers can be connected in various ways, according to the crude gas and the intended use of the carbon dioxide. In case the solution contains a large amount of dissolved valuable gas (for example acetylene or ethylene) the liberated gas mixture of conduit 8 and, if desired, of conduit 13 and, if desired likewise of conduit 14 is reconducted into the compressor 24.

When carbon dioxide having a purity of 99.9% is to be obtained, the gas currents leaving at 14, 15 and 16 and still containing residues of dissolved and loosely bound gases must be expelled or reconducted, as required. The carbon dioxide leaving the condenser 23 then possesses the desired purity.

Figure 5:
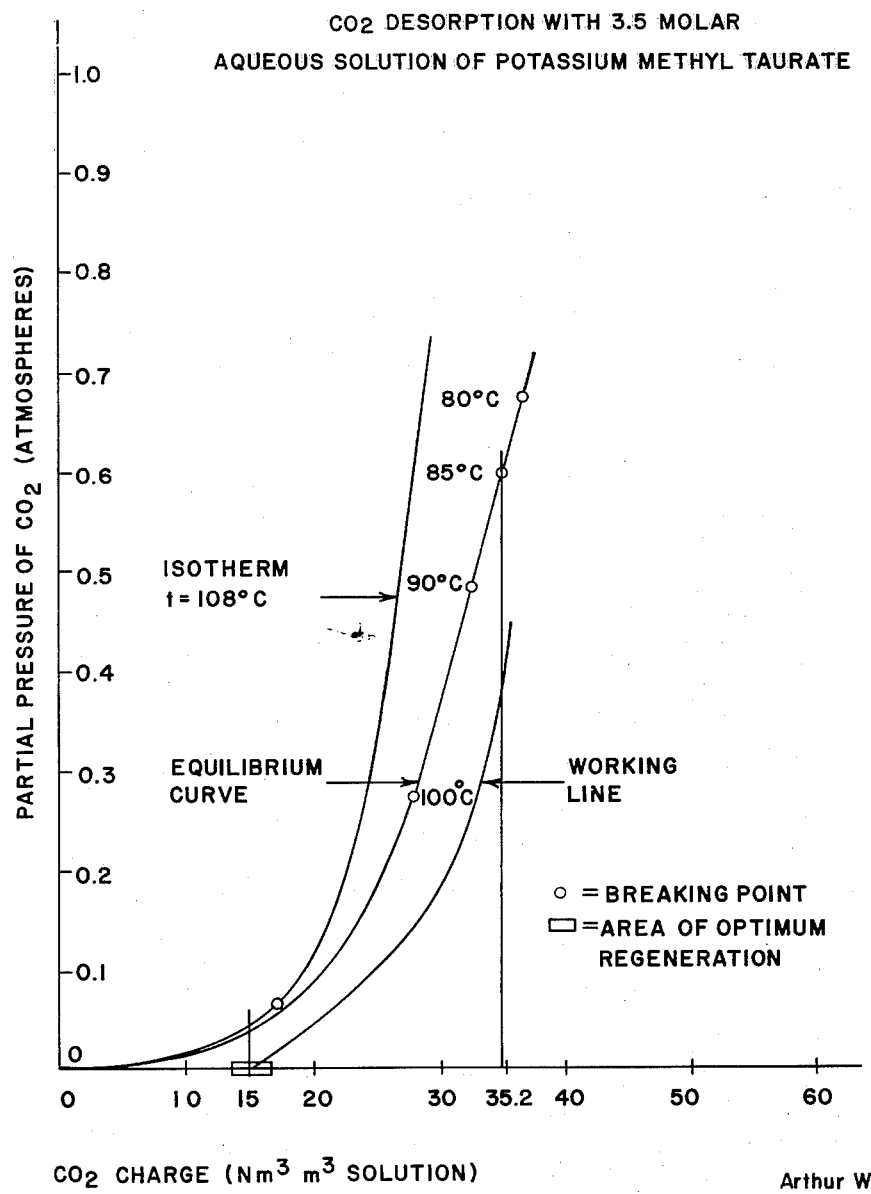

The conditions of the desorption column 21 are illustrated in FIGURE 5. The equilibrium line is obtained in that at each temperature the sum of the $CO_2$ partial pressure and the $H_2O$ partial pressure is equal to the total pressure. The pressures measured for $CO_2$ and $H_2O$ give equilibrium values which are always assigned to a definite temperature and charge. The temperatures are marked beside the equilibrium curve. The working line is characterized in that a considerably higher amount of steam is available in the lower part of the column, which is partially used for heating the solution and partially for desorbing the carbon dioxide. At the head of the column a definite amount of steam is entrained by the departing carbon dioxide. If this amount of steam would correspond to the saturation, the equilibrium line and the working line would coincide. The amount of entrained steam must be chosen greater in order to maintain also at the head of the column a displacement of equilibrium. At 85° C. and with a charge of 35.2 m.$^3$ (NTP)/m.$^3$ solution a $CO_2$ partial pressure of 0.6 absolute atmosphere is obtained for the equilibrium line. For the working line a pressure of 0.4 absolute atmosphere shall be assumed. The entrained amount of steam is thus 1,380 kg./h. The points of the working line are found by heat balance calculation. It is seen that a sufficient driving partial pressure gradient is present at each point.

The steam consumption in tons per hour is divided as follows:
(1) heating the solution from 85 to 108° C. 2.46 tons/h. corresponding to 42.3% of the steam consumption
(2) desorption heat for 1,150 m.$^3$ (NTP)/h. $CO_2$ 1.98 tons/h. corresponding to 34.0% of the steam consumption
(3) entrained steam (0.4 absolute atmosphere $CO_2$ partial pressure at the head of the desorption column) 1.38 tons/h. corresponding to 23.7% of the steam consumption.

The steam consumption amounts to 2.9 kg. per m.$^3$ (NTP) of carbon dioxide. In the known processes about 6 kg. of steam are consumed per m.$^3$ (NTP) of carbon dioxide.

The desorption column is dimensioned as follows:

Filling height _____ 10 meters.
Diameter _____ 2.5 meters.
Charge _____ Pall rings 25 x 25 mm.

We claim:
1. In a process for the substantial removal of carbon dioxide from gas mixtures by absorbing the carbon dioxide from said gas mixtures in a concentrated aqueous solution of an alkali metal salt of an amino acid which has at least one hydrogen atom bound to nitrogen and, therefore, is capable of forming a carbamic acid with carbon dioxide, and then desorbing the absorbed carbon dioxide from said solution, the improvement which comprises desorbing that part of the absorbed carbon dioxide which is in excess of a concentration of carbon dioxide of 0.1 to 0.2 mol of carbon dioxide per mol of dissolved salt of said amino acid, and again absorbing carbon dioxide, at a temperature below 60° C., in the regenerated solution, to give a total amount of carbon dioxide in the range from 0.5 to 1.1 mols of carbon dioxide per mol of dissolved salt.

2. A process as claimed in claim 1, wherein a solution of at least one compound of the formula

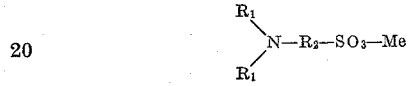

is used as absorbing agent, in which compound at least one of the radicals $R_1$ stands for hydrogen and the remaining for an aliphatic hydrocarbon radical, $R_2$ stands for an alkylene radical containing at least two carbon atoms, and Me is an alkali metal, said solution containing a predominant molar portion of a compound in which Me is potassium.

3. In a process for the substantial removal of carbon dioxide from gas mixtures by absorbing the carbon dioxide from said gas mixtures in a concentrated aqueous solution of an alkali metal salt of an amino acid which has at least one hydrogen atom bound to nitrogen and, therefore, is capable of forming a carbamic acid with carbon dioxide, and then desorbing the absorbed carbon dioxide from said solution, the improvement which comprises desorbing that part of the absorbed carbon dioxide which is in excess of a concentration of carbon dioxide of 0.14 to 0.18 mol carbon dioxide per mol of dissolved salt of said amino acid, and again absorbing carbon dioxide, at a temperature in the range from 20° to 40° C., in the regenerated solution, to give a total amount of carbon dioxide in the range from 0.55 to 0.75 mol of carbon dioxide per mol of dissolved salt.

4. A process as claimed in claim 1, wherein a solution is used as absorbing agent which contains at least in part a potassium salt of an amino acid defined in claim 1.

5. A process as claimed in claim 1, wherein up to 25 percent of free amino acid are present in the absorbing solution calculated upon the amount of the acid which is contained in the salt.

6. A process as claimed in claim 1, wherein the desorption is carried out under atmospheric pressure.

7. A process as claimed in claim 1, wherein the desorption is carried out in several stages and the temperature in the subsequent stage is higher than in a preceding stage, and the temperature in the last stage is near the boiling point of the solution.

8. A process as claimed in claim 1, wherein steam is introducted into the solution, from which the carbon dioxide is to be desorbed, in an amount being about equal to that which is escaping from the solution together with the carbon dioxide.

9. A process as claimed in claim 1, wherein the absorption is carried out under superatmospheric pressure.

References Cited in the file of this patent
UNITED STATES PATENTS
2,011,386    Ulrich et al. _____ Aug. 13, 1935